July 17, 1956  C. E. TACK ET AL  2,754,935
RAILWAY BRAKE
Filed Aug. 22, 1952
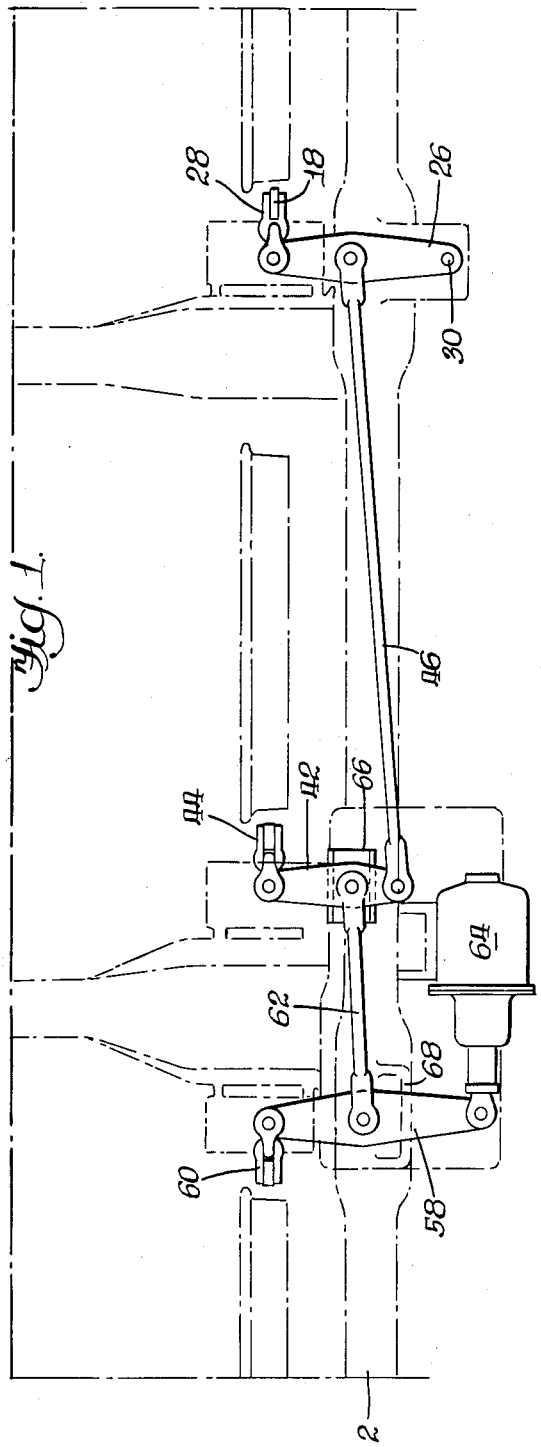
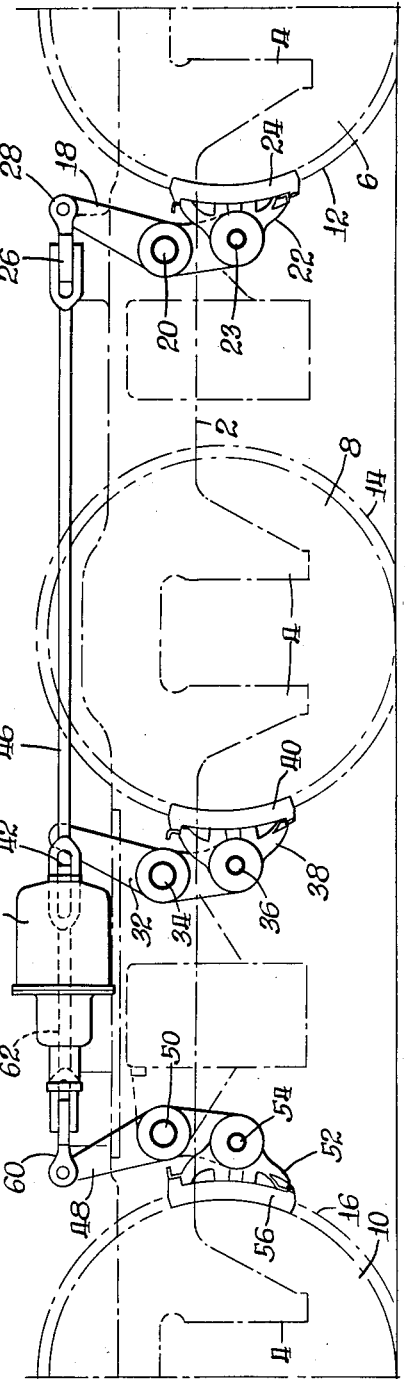
INVENTORS.
Carl E. Tack and
Edward J. Simanek
By O. B. Garner
Atty.

United States Patent Office 2,754,935
Patented July 17, 1956

2,754,935

RAILWAY BRAKE

Carl E. Tack and Edward J. Simanek, Chicago, Ill., assignors to American Steel Foundries, Chicago, Ill., a corporation of New Jersey Application August 22, 1952, Serial No. 305,777

8 Claims. (Cl. 188—46)

This invention relates to railway brake equipment and more particularly to a brake arangement for a six wheel diesel locomotive truck.

An object of this invention is to provide a brake arrangement for each side of a six wheel truck, each brake arrangement comprising three interconnected truck levers actuated from a single power cylinder operable to apply brake shoes to their respective wheel treads.

A further object of this invention is to provide a brake arrangement comprising one dead lever and two live levers interconnected by pull rods and connected to their respective truck levers, and a power cylinder connected to one of the live levers, the dead lever and live levers having their inboard ends pivotally connected to their respective truck levers and extending outboardly therefrom in a substantially common horizontal plane.

This invention further contemplates the provision of a brake arrangement which is relatively simple and inexpensive to manufacture and effective and reliable in operation to decelerate a railway truck.

This invention embodies other novel features, details of construction and arrangement of parts which are hereinafter set forth in the specification and claims and illustrated in the accompanying drawing, wherein:

Figure 1 is a top plan view showing a brake arrangement, embodying features of this invention, applied to one side of a railway truck, the opposite side of the truck having a corresponding brake arrangement.

Figure 2 is a side elevational view of same.

Referring now to the drawing for a better understanding of this invention, the brake arrangement is shown as applied to a six wheel locomotive truck comprising a frame 2 provided with sets of pedestals 4 to receive conventional journal boxes (not shown) in which are journaled three wheel and axle assemblies 6, 8 and 10 including wheels 12, 14 and 16. Only one side of the truck and its associated brake arrangement is shown to avoid repetition, as opposite sides of the truck are similar in construction and provided with similar brake arrangements.

The brake arrangement is shown as comprising a truck lever 18 pivotally mounted intermediate its ends upon a pivot pin 20 secured on the truck frame 2, the lower end of the lever pivotally supporting at 23 a brake head 22 having a brake shoe 24 keyed thereon for engagement with the tread of the wheel 12. The upper end of the truck lever 18 is connected to the inboard end of a dead lever 26 by means of clevises 28. The dead lever 26 is disposed in a substantially horizontal plane and pivotally connected at its outboard end to the truck frame at 30.

An intermediate truck lever 32 is journaled on a pivot pin 34 fixed on the truck frame 2, the lower end of the lever being pivotally connected at 36 to a brake head 38 carrying a shoe 40 to engage the intermediate wheel 14. The upper end of the truck lever 32 is connected to the inboard end of a horizontal live lever 42 by means of clevises 44, and the outboard end of the live lever is connected to the intermediate portion of the dead lever 26 by means of a pull rod 46.

Another truck lever 48 is pivotally mounted on a pivot pin 50 secured on the truck frame 2 and has its lower end pivotally connected to a brake head 52 by a pin 54, the brake head having a shoe 56 keyed thereon to frictionally engage the periphery of the wheel 16. The inboard end of a horizontal live lever 58 is connected to the upper end of the truck lever 48 by clevises 60. The medial portions of the live levers 42 and 58 are interconnected by a pull rod 62, and the outboard end of the live lever 58 is connected to the piston of a power cylinder 64 mounted on the truck. The live levers 42 and 58 are supported for movement longitudinally of the truck frame 2 on guide brackets 66 and 68, respectively, provided on the frame.

In the operation of the brake arrangement to decelerate a truck, the piston in power cylinder 64 actuates the live lever 58 to pivot the truck lever 48 about the pin 50 in a clockwise direction, as illustrated in Figure 2, to frictionally engage the shoe 56 against the wheel 16. By interconnecting the medial portions of the live levers 58 and 42 by means of the pull rod 62, the power cylinder acts to pivot the truck lever 32 about the pin 34 to move the shoe 38 into engagement with the wheel 14, and the pull rod 46 acts through the dead lever 26 to pivot the truck lever 18 to apply the shoe 24 to the wheel 12.

While this invention has been shown in but one form it is obvious to those skilled in the art that it is not so limited but is susceptible of various changes and modifications without departing from the spirit and scope of the claimed invention.

We claim:

1. In a brake arrangement for three wheels aligned along one side of a six wheel railway truck, a truck frame, three vertically extending truck levers pivotally mounted intermediate their ends upon said frame, first and second live levers extending horizontally transversely of the frame and supported intermediate their ends for movement longitudinally of the frame, a dead lever extending horizontally transversely of the frame and pivotally connected at its outboard end to said frame, means pivotally connecting the inboard ends of said first and second live levers and said dead lever to their related truck levers, a first pull rod pivotally connected at its ends to the medial portions of said first and second live levers, a second pull rod having one end thereof pivotally connected to the outboard end of said second live lever and its other end pivotally connected to the medial portion of said dead lever, and means connected to the outboard end of said first live lever to actuate the brake arrangement.

2. In a brake arrangement for three wheels on one side of a six wheel railway truck, first and second live levers and a dead lever disposed in a horizontal plane, truck levers arranged in a vertical plane with their upper ends pivotally connected to said live and dead levers, a first pull rod pivotally connected at its ends to the medial portions of said first and second live levers, a second pull rod having one end thereof pivotally connected to the outboard end of said second live lever and its other end pivotally connected to said dead lever intermediate the ends of the latter, and means engaging the outboard end of said first live lever to actuate the brake arrangement.

3. In a brake arrangement for three wheels on one side of a six wheel railway truck, first and second live levers and a dead lever disposed in a horizontal plane, truck levers arranged in a vertical plane with their upper ends pivotally connected to said live and dead levers, a first pull rod pivotally connected at its ends to the medial portions of said first and second live levers, a second pull rod having one end thereof pivotally connected to the outboard end of said second live lever and its other end pivotally connected to said dead lever intermediate the ends of the latter, and means engaging the outboard end of said first live lever to actuate the brake arrangement, said means comprising a power cylinder.

4. In a railway truck having three wheels on each side thereof, two brake arrangements arranged on opposite sides of the truck, each brake arrangement comprising three truck levers disposed in a vertical plane, first and second live levers and a dead lever all disposed in a horizontal plane and extending transversely of the truck with their inboard ends connected to said truck levers, said dead lever having its outboard end pivotally connected to said truck, a first pull rod connecting the medial portion of said dead lever to the outboard end of said second live lever, a second pull rod connecting the medial portions of said first and second live levers, and means on said truck operative to move the outboard end of said first live lever.

5. In a six wheel railway truck, a truck frame, two brake arrangements provided on opposite sides of said frame, each brake arrangement comprising vertically extending truck levers pivotally mounted intermediate their ends on said frame, first and second live levers and a dead lever extending horizontally transversely of the frame and having their inboard ends connected to the upper ends of their respective truck levers, said dead lever having its outboard end pivotally connected to said frame, a first pull rod connecting the medial portion of said dead lever to the outboard end of said second live lever, a second pull rod connecting the medial portion of said second live lever to the medial portion of said first live lever, power means on said frame connected to the outboard end of said first live lever.

6. In a six wheel railway truck, a truck frame, two brake arrangements provided on opposite sides of said frame, each brake arrangement comprising vertically extending truck levers pivotally mounted intermediate their ends on said frame, first and second live levers and a dead lever extending horizontally transversely of the frame and having their inboard ends connected to the upper ends of their respective truck levers, said dead lever having its outboard end pivotally connected to said frame, a first pull rod connecting the medial portion of said dead lever to the outboard end of said second live lever, a second pull rod connecting the medial portion of said second live lever to the medial portion of said first live lever, power means on said frame connected to the outboard end of said first live lever, and guide brackets on said frame to support said first and second live levers.

7. In a six wheel railway truck, a truck frame, two brake arrangements provided on opposite sides of said frame, each brake arrangement comprising vertically extending truck levers pivotally mounted intermediate their ends on said frame, first and second live levers and a dead lever extending horizontally transversely of the frame and having their inboard ends connected to the upper ends of their respective truck levers, said dead lever having its outboard end pivotally connected to said frame, a first pull rod connecting the medial portion of said dead lever to the outboard end of said second live lever, a second pull rod connecting the medial portion of said second live lever to the medial portion of said first live lever, power means on said frame connected to the outboard end of said first live lever, and brake heads pivotally mounted on the lower ends of said truck levers.

8. In a six wheel railway truck, a truck frame, two brake arrangements provided on opposite sides of said frame, each brake arrangement comprising vertically extending truck levers pivotally mounted intermediate their ends on said frame, first and second live levers and a dead lever extending horizontally transversely of the frame and having their inboard ends connected to the upper ends of their respective truck levers, said dead lever having its outboard end pivotally connected to said frame, a first pull rod connecting the medial portion of said dead lever to the outboard end of said second live lever, a second pull rod connecting the medial portion of said second live lever to the medial portion of said first live lever, power means on said frame connected to the outboard end of said first live lever, said truck levers being substantially coplanar, and said first and second live levers and said dead lever being substantially coplanar.

References Cited in the file of this patent
UNITED STATES PATENTS

| | | |
|---|---|---|
| 731,477 | Livingston | June 23, 1903 |
| 1,107,638 | Westlake | Aug. 18, 1914 |